(12) United States Patent
Holmes et al.

(10) Patent No.: US 8,641,567 B2
(45) Date of Patent: Feb. 4, 2014

(54) HYBRID POWERTRAIN WITH MANUAL TRANSMISSION AND OFF-LATCHING CLUTCH, AND METHOD OF OPERATING THE SAME

(75) Inventors: Alan G. Holmes, Clarkston, MI (US); Anthony L. Smith, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 248 days.

(21) Appl. No.: 13/290,495

(22) Filed: Nov. 7, 2011

(65) Prior Publication Data
US 2013/0116085 A1 May 9, 2013

(51) Int. Cl.
*F16H 3/72* (2006.01)

(52) U.S. Cl.
USPC .......................................................... 475/5

(58) Field of Classification Search
USPC ............... 475/1, 5; 477/5, 3, 2, 1, 7, 8, 15; 192/30 R, 31, 41 R, 43, 43.1
See application file for complete search history.

(56) References Cited

U.S. PATENT DOCUMENTS

| | | | |
|---|---|---|---|
| 7,108,087 B2 * | 9/2006 | Imai | 180/65.23 |
| 8,042,670 B2 * | 10/2011 | Bartos et al. | 192/43.1 |
| 2007/0278061 A1 * | 12/2007 | Wittkopp et al. | 192/43.1 |
| 2008/0169165 A1 * | 7/2008 | Samie et al. | 192/43 |
| 2013/0109530 A1 * | 5/2013 | Kaltenbach et al. | 477/5 |
| 2013/0157806 A1 * | 6/2013 | Koyama et al. | 477/5 |

* cited by examiner

*Primary Examiner* — David D Le
*Assistant Examiner* — David J Hlavka
(74) *Attorney, Agent, or Firm* — Quinn Law Group, PLLC

(57) ABSTRACT

A powertrain for a hybrid vehicle includes a clutch interconnecting an internal combustion engine and an electric motor. The electric motor is coupled to a manually operated gearbox operable in at least one electric only drive position and at least one hybrid drive position. A latch is coupled to the clutch and is moveable between a closed position inhibiting the clutch from interconnecting the internal combustion engine and the electric motor when the gearbox is disposed in the electric only drive position, and an open position allowing the clutch to interconnect the internal combustion engine and the electric motor when the gearbox is disposed in the hybrid drive position.

7 Claims, 1 Drawing Sheet

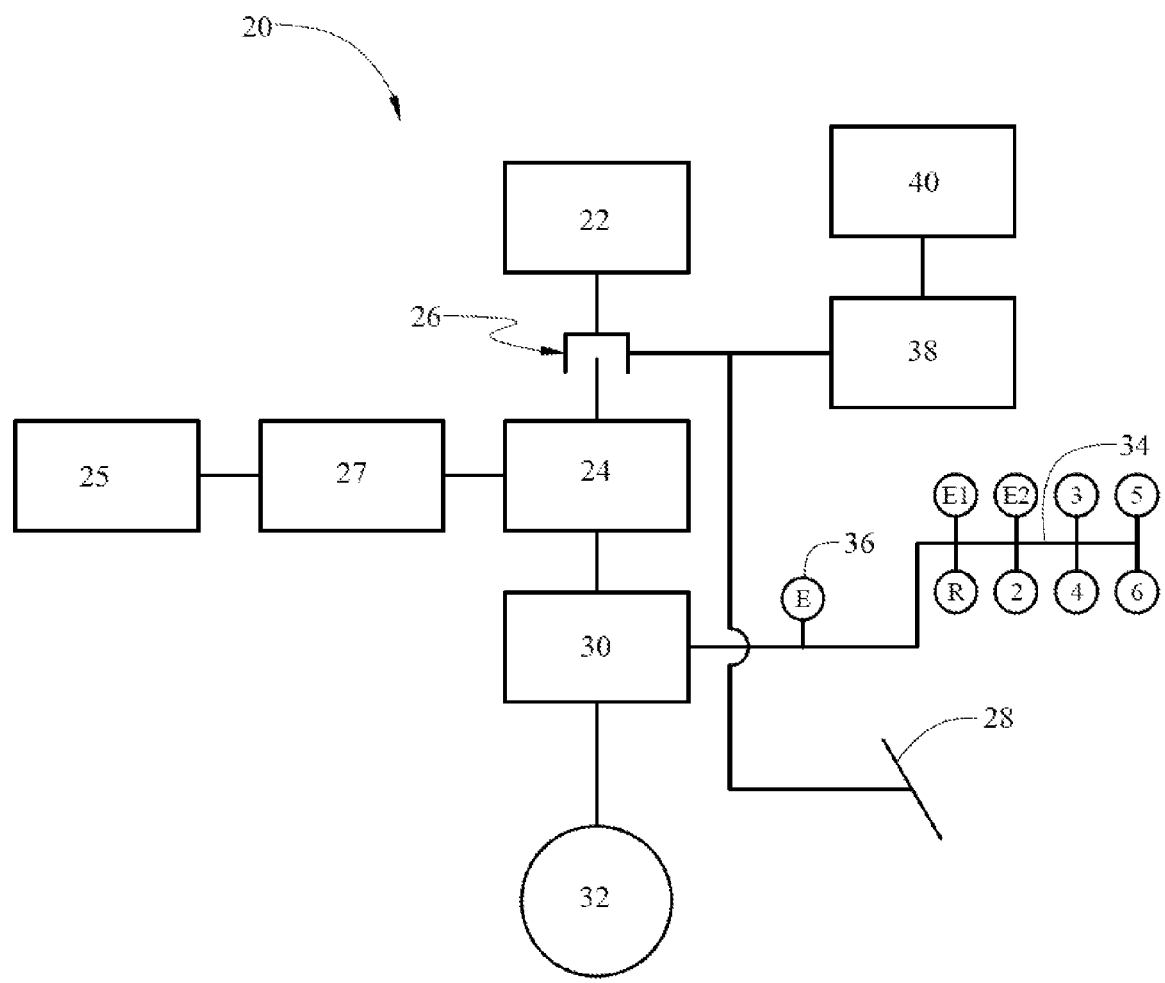

HYBRID POWERTRAIN WITH MANUAL TRANSMISSION AND OFF-LATCHING CLUTCH, AND METHOD OF OPERATING THE SAME

TECHNICAL FIELD

The invention generally relates to a powertrain for a hybrid vehicle, and to a method of operating the powertrain.

BACKGROUND

Hybrid vehicles may operate in an electric only drive configuration, in which an electric motor provides the drive torque to a transmission to power the vehicle, or may alternatively operate in a hybrid drive configuration, in which either the electric motor and/or an internal combustion engine may be engaged to provide the drive torque to the transmission. When operating in the electric only drive configuration, the internal combustion engine must be disconnected from the electric motor and the transmission so that the electric motor does not transfer torque to the internal combustion engine. When operating in the hybrid drive configuration, the electric motor and the internal combustion engine may be coupled together and/or coupled to the transmission to transmit torque therebetween.

The transmission includes a gearbox that provides a plurality of different gear ratios used to alter a speed and/or torque output from the transmission to the drive wheels of the vehicle. Manual transmissions are more efficient than automatic transmissions due to the energy loss associated with a torque converter of the automatic transmissions. Accordingly, a hybrid vehicle utilizing a manual transmission may be more fuel efficient than the same hybrid vehicle utilizing an automatic transmission. However, the manual transmission, when positioned in a drive gear, is rotationally fixed to the torque providing source, e.g., the internal combustion engine. As noted above, when operating in the hybrid drive configuration, the internal combustion engine must be disconnected from the electric motor and the transmission.

SUMMARY

A powertrain for a vehicle is provided. The powertrain includes an internal combustion engine and an electric motor. A clutch is selectively moveable between an engaged position and a disengaged position. When in the engaged position, the clutch interconnects the internal combustion engine and the electric motor. When in the disengaged position, the clutch disconnects the internal combustion engine and the electric motor. A gearbox is coupled to the electric motor for receiving a torque from the electric motor and for outputting a torque to at least one drive wheel. The gearbox is operable in at least one electric only drive position and at least one hybrid drive position. A latch is coupled to the clutch. The latch is moveable between a closed position and an open position. When in the closed position, the latch inhibits movement of the clutch into the engaged position. The latch is moveable into the closed position when the gearbox is disposed in the at least one electric only drive position. When in the open position, the latch allows the movement of the clutch into the engaged position. The latch is moveable into the open position when the gearbox is disposed in the at least one hybrid drive position.

A method of operating a powertrain of a vehicle is also provided. The method includes detecting if a gearbox is operating in an electric only drive position or in a hybrid drive position, and inhibiting engagement of a clutch interconnecting an internal combustion engine and an electric motor when the gearbox is operating in the electric only drive position. The clutch is inhibited from interconnecting the internal combustion engine and the electric motor to prevent torque transmission between the internal combustion engine and the electric motor.

Accordingly, the powertrain utilizes the latch to inhibit torque transmission between the internal combustion engine and the electric motor when the gearbox is in the electric only drive position, thereby allowing use of a manual transmission. The powertrain provides full hybrid functionality, particularly related to an electric only drive configuration in which the electric motor provides the drive torque to the gearbox, i.e., transmission, with only a single electric motor and a simple efficient manual transmission.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic diagram of a powertrain for a hybrid vehicle.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims.

Referring to FIG. 1, wherein like numerals indicate like parts, a powertrain is generally shown at 20. The powertrain 20 is for a hybrid vehicle, and includes an internal combustion engine 22 and an electric motor 24. The internal combustion engine 22 may include but is not limited to a gasoline engine or a diesel engine, and is operable to generate a torque, which may be used to power the vehicle and/or power the electric motor 24. The electric motor 24 is coupled to a battery 25 through an inverter 27 that interconnects the battery 25 and the electric motor 24. The electric motor 24 is operable to convert electrical power from the battery 25 into a drive torque to power the vehicle, and may also include a generator and be operable to convert mechanical power provided from the internal combustion engine 22 into electrical power, which may be stored in the battery 25 or applied to power the vehicle.

A clutch 26 selectively interconnects the internal combustion engine 22 and the electric motor 24. The clutch 26 is moveable between an engaged position and a disengaged position. When in the engaged position, the clutch 26 connects the internal combustion engine 22 and the electric motor 24 for transmitting torque therebetween. When in the disengaged position, the clutch 26 disconnects the internal combustion engine 22 from the electric motor 24 to prevent torque transmission therebetween. The clutch 26 may include any suitable style and/or configuration capable of connecting and disconnecting the internal combustion engine 22 and the electric motor 24.

A clutch actuator 28 is coupled to the clutch 26. The clutch actuator 28 is manually moveable to manipulate the clutch 26 between the engaged position and the disengaged position. For example, the clutch actuator 28 may include a pedal hydraulically, mechanically and/or electrically coupled to the clutch 26 to control movement of the clutch 26. Depression of the pedal causes the clutch 26 to move from the engaged position into the disengaged position, whereupon release of the pedal causes the clutch 26 to move from the disengaged position into the engaged position. While the clutch actuator 28 is shown and described herein as including a pedal, it should be appreciated that the clutch actuator 28 may include some other device. The clutch 26 is normally positioned and/or biased into the engaged position, and is moveable into the disengaged position in response to movement of the clutch actuator 28. Accordingly, the clutch 26 must be acted upon in order to move the clutch 26 from the engaged position into the disengaged position.

A gearbox 30, often referred to as a transmission, is coupled to the electric motor 24 and the internal combustion engine 22. The gearbox 30 is configured to receive a torque from one or both of the internal combustion engine 22 and the electric motor 24, and to output a torque to at least one drive wheel 32. The gearbox 30 provides a plurality of different gear ratios that are selectively used to alter a speed and/or torque output from the gearbox 30 that is applied to the drive wheel 32.

The gearbox 30 is operable in at least one electric only drive position and at least one hybrid drive position. When in the electric only drive position, the gearbox 30 receives torque from the electric motor 24 only. When in the hybrid drive position the gearbox 30 may receive torque from either the electric motor 24 or the internal combustion engine 22.

The gearbox 30 is manually operated, and operates in combination with the clutch actuator 28 and the clutch 26 as is known in the art to shift between different gear ratios. The gearbox 30 includes a gear selector 34 that is manually moveable to manipulate the gearbox 30 between the electric only drive position and the hybrid drive position. The hybrid drive position of the gearbox 30 includes multiple gear ratios, indicated by R and the gear ratio numbers 2-6 shown in FIG. 1. The gear selector 34 may be used to position the gearbox 30 within any one of the gear ratios associated with the hybrid drive position. The electric only drive position of the gearbox 30 may include only a single gear ratio, or may alternatively include multiple gear ratios, such as indicated by E1 and E2 shown in FIG. 1. The gear selector 34 may be used to position the gearbox 30 in any one of the gear ratios associated with the electric only drive position.

The powertrain 20 further includes a gear indicator 36. The gear indicator 36 indicates when the gearbox 30 is disposed in the electric only drive position. Accordingly, in the exemplary embodiment shown in FIG. 1, the gear indicator 36 indicates when the gearbox 30 is disposed in either the E1 gear ratio or the E2 gear ratio. The gear indicator 36 may include any device capable of signaling to an operator the position of the gearbox 30. For example, the gear indicator 36 may include a light disposed on an instrument panel of the vehicle, which is lighted when the gearbox 30 is in the electric only drive position to indicate such. The gear indicator 36 may be coupled to one of the gearbox 30, the gear selector 34, a sensor, a control module, or some other device that signals the gear indicator 36. While the gear indicator 36 is described above as being lighted when the gearbox 30 is disposed in the electric only drive position, it should be appreciated that the lighting scheme may be reversed, with the gear indicator 36 lighted when the gearbox 30 is disposed in the hybrid drive position, and not lighted when disposed in the electric only drive position.

A latch 38 is coupled to the clutch 26. The latch 38 is moveable between a closed position and an open position. When in the closed position, the latch 38 inhibits movement of the clutch 26 into the engaged position. When in the open position, the latch 38 allows movement of the clutch 26 into the engaged position. The latch 38 is moved into the closed position when the gearbox 30 is disposed in the electric only drive position to prevent the clutch 26 from interconnecting the internal combustion engine 22 and the electric motor 24, thereby preventing torque transmission therebetween. Accordingly, only the electric motor 24 may be engaged and coupled to the gearbox 30 to power the vehicle when the gearbox 30 is disposed in the electric only drive position. The latch 38 is moved into the open position when the gearbox 30 is disposed in the hybrid drive position to allow the clutch 26 to interconnect the internal combustion engine 22 and the electric motor 24, thereby allowing torque transmission therebetween. Accordingly, both the internal combustion engine 22 and/or the electric motor 24 may be engaged and coupled to the gearbox 30 when the gearbox 30 is disposed in the hybrid drive position.

The drivetrain includes a controller 40. The controller 40 is coupled to the latch 38 and controls the actuation of the latch 38 between the open position and the closed position. Furthermore, the controller 40 may also be coupled to and configured to control the clutch actuator 28. The controller 40 may include a control module, computer, or some other similar device capable of controlling the latch 38. The controller 40 may include all hardware, software, sensors, communications, control algorithms, etc. necessary to receive data related to the position of the gearbox 30, i.e., whether the gearbox 30 is disposed in the electric only drive position or the hybrid drive position, and to control movement of the latch 38 between the open position and the closed position.

A method of operating the powertrain 20 is also provided. The method includes detecting if the gearbox 30 is operating in the electric only drive position or in the hybrid drive position. The position of the gearbox 30 may be detected, for example, through a sensor disposed within the gearbox 30 and configured to sense the position or gear ratio of the gearbox 30, through a sensor configured to sense a position of the gear selector 34, an output from the controller 40, or in some other manner not described herein. The position of the gearbox 30 is indicated to the operator. More specifically, the gear indicator 36 indicates whether the gearbox 30 is disposed in one of the gear ratios associated with the electric only drive position, or is disposed in one of the gear ratios associated with the hybrid drive position.

When it is detected that the gearbox 30 is disposed in the electric only drive position, only the electric motor 24 may be engaged to provide a drive torque to the gearbox 30 and thereby power the vehicle. In order to prevent torque transmission between the internal combustion engine 22 and the electric motor 24 when the gearbox 30 is disposed in the electric only drive position, the clutch 26 is inhibited from interconnecting the internal combustion engine 22 and the electric motor 24 to prevent torque transmission between the internal combustion engine 22 and the electric motor 24. The clutch 26 is inhibited by moving the latch 38 into the closed position, thereby preventing the clutch 26 from moving into the engaged position and interconnecting the internal combustion engine 22 and the electric motor 24.

When it is detected that the gearbox 30 is disposed in the hybrid drive position, either the electric motor 24 and/or the internal combustion engine 22 may be engaged to provide the drive torque to the gearbox 30 and thereby power the vehicle. In order to allow torque transmission between the internal combustion engine 22 and the electric motor 24 when the gearbox 30 is in the hybrid drive position, the clutch 26 is allowed to interconnect the internal combustion engine 22 and the electric motor 24, thereby allowing torque transmission between the internal combustion engine 22 and the electric motor 24. Allowing engagement of the clutch 26 includes moving the latch 38 into the open position to allow the clutch 26 to move into the engaged position to interconnect the internal combustion engine 22 and the electric motor 24.

As described above, the hybrid drive position includes a plurality of hybrid drive positions, e.g., R and 2-6. In order to perform a "flying start", in which the internal combustion engine 22 is started while the vehicle is in motion under power provided by the electric motor 24, the method further includes indicating a specific one of the plurality of hybrid drive positions to position the gearbox 30 in order to start the internal combustion engine 22 while the vehicle is moving. The specific hybrid drive position, i.e., the specific gear ratio, in which to position the gearbox 30 in order to perform a flying start is based upon the current operating conditions of the vehicle. The controller 40 receives information related to the current operating conditions of the vehicle, such as vehicle speed, acceleration, etc., and indicates to the operator which gear ratio associated with the hybrid drive position of the gearbox 30 is appropriate to start the internal combustion engine 22 for the current operating conditions.

In order to perform a flying start when the gearbox 30 is currently disposed in the electric only drive position, the clutch actuator 28 is moved to disengage the clutch 26, i.e., to disconnect the internal combustion engine from the electric motor 24. For example, if the clutch actuator 28 includes a standard clutch pedal, the pedal is depressed to disengage the clutch 26. The gear selector 34 is manually manipulated to re-position the gearbox 30 into the specific gear ratio of the hybrid drive position indicated by the controller 40 in which to start the internal combustion engine 22 for the current operating conditions of the vehicle, thereby moving the gearbox 30 from a gear ratio associated with the electric only drive position to a gear ratio associated with the hybrid drive position. Once the gearbox 30 is disposed in the hybrid drive position, the controller 40 moves the latch 38 into the open position to allow the clutch 26 to move between the engaged position interconnecting the internal combustion engine 22 and the electric motor 24, and the disengaged position disconnecting the internal combustion engine 22 and the electric motor 24. After the latch 38 is moved to the open position, the clutch actuator 28 may be manually actuated to engage the clutch 26 and connect the internal combustion engine 22 and the electric motor 24 in torque transmitting communication. Actuating the clutch actuator 28 may include, for example, releasing a clutch pedal and allowing the clutch pedal to return to its non-depressed position. Engaging the clutch 26 allows power, i.e., torque, from the electric motor 24 to be transferred through the clutch 26 to the internal combustion engine 22 to spin, i.e., start, the internal combustion engine 22, much in the same way a starter motor would be used to start an engine.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A powertrain for a vehicle, the powertrain comprising:
an internal combustion engine;
an electric motor;
a clutch selectively moveable between an engaged position for interconnecting the internal combustion engine and the electric motor, and a disengaged position for disconnecting the internal combustion engine and the electric motor;
a gearbox operable in at least one electric only drive position and at least one hybrid drive position and coupled to the electric motor for receiving a torque from the electric motor and for outputting a torque to at least one drive wheel; and
a latch coupled to the clutch and moveable between a closed position for inhibiting movement of the clutch into the engaged position when the gearbox is disposed in the at least one electric only drive position, and an open position for allowing the movement of the clutch into the engaged position when the gearbox is disposed in the at least one hybrid drive position.

2. A powertrain as set forth in claim 1 further comprising a gear selector coupled to the gearbox and manually moveable to manipulate the gearbox between the at least one electric only drive position and the at least one hybrid drive position.

3. A powertrain as set forth in claim 2 further comprising a gear indicator coupled to one of the gearbox and the gear selector and configured for indicating when the gearbox is disposed in the at least one electric only drive position.

4. A powertrain as set forth in claim 1 further comprising a clutch actuator coupled to the clutch and manually moveable to manipulate the clutch between the engaged position and the disengaged position.

5. A powertrain as set forth in claim 1 further comprising a controller coupled to the latch and configured for actuating the latch between the closed position and the open position.

6. A powertrain as set forth in claim 1 wherein only the electric motor is engaged and coupled to the gearbox when the gearbox is disposed in the at least one electric only drive position, and wherein both the internal combustion engine and the electric motor may be engaged and coupled to the gearbox when the gearbox is disposed in the at least one hybrid drive position.

7. A powertrain as set forth in claim 1 wherein the gearbox includes a manually operated gearbox.

* * * * *